US012611906B1

(12) United States Patent

Campbell et al.

(10) Patent No.: US 12,611,906 B1

(45) Date of Patent: Apr. 28, 2026

(54) EXTERNAL BYPASS APPARATUS FOR VEHICLE SHOCK ABSORBERS

(71) Applicant: Car Sound Exhaust System, Inc., Oceanside, CA (US)

(72) Inventors: Jason Campbell, Costa Mesa, CA (US); Jerry Nathan Zaiden, Newport Beach, CA (US); Luke August Arana, San Diego, CA (US); Jack David Busby, Oceanside, CA (US); Craig Allen Hall, Poway, CA (US); Jeffrey Lawrence Hermann, Poway, CA (US)

(73) Assignee: Car Sound Exhaust System, Inc., Oceanside, CA (US)

( * ) Notice: Subject to any disclaimer, the term of this patent is extended or adjusted under 35 U.S.C. 154(b) by 0 days.

(21) Appl. No.: 19/346,866

(22) Filed: Oct. 1, 2025

Related U.S. Application Data

(60) Provisional application No. 63/713,694, filed on Oct. 30, 2024.

(51) Int. Cl.
B60G 17/08 (2006.01)
B60G 13/10 (2006.01)

(52) U.S. Cl.
CPC ............. B60G 17/08 (2013.01); B60G 13/10 (2013.01); *B60G 2202/242* (2013.01); *B60G 2206/41* (2013.01); *B60G 2500/114* (2013.01)

(58) Field of Classification Search
CPC .. B60G 17/08; B60G 13/10; B60G 2202/242; B60G 2206/41; B60G 2500/114; F16F 9/44; F16F 9/53
See application file for complete search history.

(56) References Cited

U.S. PATENT DOCUMENTS

| | | | |
|---|---|---|---|
| 7,628,259 | B2 | 12/2009 | Norgaard et al. |
| 8,763,639 | B2 | 7/2014 | Cook et al. |
| 9,586,645 | B2 | 3/2017 | Becker et al. |
| 11,602,971 | B2 | 3/2023 | Strickland et al. |
| 11,879,517 | B2 | 1/2024 | Shimauchi et al. |
| 11,927,242 | B2 | 3/2024 | Smith et al. |
| 11,976,706 | B2 | 5/2024 | Marking |
| 2006/0096817 | A1 | 5/2006 | Norgaard et al. |
| 2010/0109277 | A1 | 5/2010 | Furrer |
| 2011/0079476 | A1 | 4/2011 | Holt et al. |
| 2023/0109503 | A1 | 4/2023 | Awano et al. |
| 2024/0003401 | A1 | 1/2024 | Verstoep |

FOREIGN PATENT DOCUMENTS

CN     111288105 A     6/2020

OTHER PUBLICATIONS

International Search Report and Written Opinion, PCT/US2025/048936, mailed Dec. 19, 2025.

*Primary Examiner* — Paul N Dickson
*Assistant Examiner* — Matthew Joseph Ganci
(74) *Attorney, Agent, or Firm* — Master Key IP, LLP; Justin G. Sanders

(57)     ABSTRACT

An improved external bypass apparatus for vehicle shock absorbers is disclosed. In at least one embodiment, the apparatus provides an at least one compression bypass assembly external to and in fluid communication with a shock housing of the shock absorber that is capable of maximizing flow capacity of the shock fluid and allowing for relatively easier adjustability of shock fluid flow rate. Additionally, in at least one embodiment, the apparatus provides a remote reservoir in fluid communication with the shock housing and configured for cooling the shock housing and allowing for greater suspension travel of the shock absorber.

20 Claims, 13 Drawing Sheets

EXTERNAL BYPASS APPARATUS FOR VEHICLE SHOCK ABSORBERS

RELATED APPLICATIONS

This application claims priority and is entitled to the filing date of U.S. provisional application Ser. No. 63/713,694, filed on Oct. 30, 2024. The contents of the aforementioned application are incorporated herein by reference.

BACKGROUND

The subject of this patent application relates generally to vehicle shock absorbers, and more particularly to an improved external bypass apparatus for vehicle shock absorbers.

Applicant hereby incorporates herein by reference any and all patents and published patent applications cited or referred to in this application.

By way of background, suspension springs of a vehicle support the weight of the vehicle and its load, and absorb road shocks. Shock absorbers help control or dampen spring action to avoid spring oscillation and assist in maintaining control of the vehicle, and as a result, are also referred to as "dampers." When a vehicle moves over a bump in the road, the wheel accordingly responds by moving up with the bump, and then back down after having passed the bump. As the vehicle moves over the bump, the spring and shock absorber compress since the wheel moves up toward the "sprung weight" of the vehicle in a phase referred to as "compression." After passing the bump, the spring and shock absorber extend out in the opposite direction in a phase referred to as "rebound."

The shock absorber is designed to prevent the spring from achieving either full compression or full extension. Full compression indicates that the vehicle's suspension system is "bottomed out." Bottoming out may damage the spring and/or shock absorber. Full extension means that the vehicle's suspension system is "floating," and possibly no longer in contact with the road. Thus, a well-designed spring/shock absorber system allows the vehicle chassis to remain relatively steady, and keeps the tires in contact with the ground despite bumps or holes in the road, and/or forces caused by cornering or changes in the vehicle's speed. In high performance applications, such as off-road applications, and/or off-road racing, the springs and shock absorbers are considered one of the more important tunable systems on the vehicle, and one that can greatly affect the vehicle's handling characteristics. Indeed, adjusting the shock absorber characteristics can dramatically affect the way the off-road vehicle performs when it drives over uneven terrain, turns a corner, accelerates, and/or brakes.

Most shock absorbers include an fluid-filled cylinder or tube in which a main shock piston moves up and down in response to movement of the wheel relative to the vehicle chassis. The piston typically divides the cylinder into upper and lower fluid chambers. The movement of the piston forces oil or hydraulic fluid (hereinafter collectively referred to as "shock fluid") in the cylinder to flow through small fluid passages or channels in the piston. The channels in the piston may be restricted by spring-loaded check valves or deflection discs that deflect under pressure. The resulting fluid friction limits both compression and rebound. The more easily the fluid flows through the channels, the softer the ride. In contrast, smaller channels and stiffer check valves or deflection discs, have greater restriction and provide a stiffer ride. Thus, varying the size of the channels, or the stiffness of the valves or deflection discs, alters the rebound and compression characteristics of the spring/damper system, and changes the ride characteristics of the vehicle. For high performance applications, such adjustability is greatly desired, particularly if the rebound and compression settings can be independently changed in a variety of ways.

As illustrated in the diagram of FIG. 1, bypass shocks 200 for vehicles (particularly, off-road vehicles) allow shock fluid 202 to flow through one or more external bypass tubes 204 that are positioned around the main shock piston 206, thereby providing additional means for adjusting rebound and compression resistance characteristics. Each bypass tube 204 is in fluid communication with the main shock piston 206 via a bypass port 208, thereby forming a bypass circuit. Additionally, each bypass tube 204 contains a check valve 210 that only allows shock fluid 202 to flow in one direction. By stacking bypass tubes 204 around the shock body 212 at different heights, the shock 200 will have softer and stiffer zones. The stiffness in each zone is controlled by the diameter of the bypass tube 204, and how far the check valve 210 is allowed to open.

Based on these known traditional bypass shocks, there remains a need for an improved bypass shock that capable of maximizing flow capacity of the shock fluid, allowing for relatively easier adjustability of shock fluid flow rate, reducing audible operation noise during use, and improving cooling efficiency, while also being relatively easier to manufacture and subsequently service/maintain. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing an improved external bypass apparatus for vehicle shock absorbers. In at least one embodiment, the apparatus provides an at least one compression bypass assembly external to and in fluid communication with a shock housing of the shock absorber. The at least one compression bypass assembly provides a compression bypass tube positioned in line between a first fluid chamber of the shock housing and a second fluid chamber of the shock housing for allowing a volume of shock fluid within the first fluid chamber to bypass a shock piston within the shock housing as the shock piston moves into a compressed position. An oval-shaped compression bypass port is positioned within a housing wall of the shock housing, in line between the first fluid chamber of the shock housing and the compression bypass tube, for establishing fluid communication therebetween. A one-way compression bypass valve is positioned in line between the compression bypass tube and the second fluid chamber for selectively regulating a flow rate of the shock fluid passing through the compression bypass tube into the second fluid chamber. The compression bypass valve provides a valve body having an inlet port in fluid communication with the compression bypass tube and an outlet port in fluid communication with the second fluid chamber of the shock housing. A hollow cylindrical spool is slidably positioned within the valve body, an open end of the spool in fluid communication with the inlet port, with a circumferential sidewall of the spool providing an at least one spool aperture positioned and configured for temporarily allowing the shock fluid to flow radially therethrough. The spool is configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough. A return spring is positioned within the valve body and configured for biasing the spool into the closed position. An adjustment stopper is threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position.

In another embodiment, the apparatus provides a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber. The first reservoir chamber contains a volume of a shock gas. The second reservoir chamber is in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing. The reservoir end of the reservoir tube provides an eductor nozzle configured for introducing a volume of shock fluid from the second fluid chamber of the shock housing into the second reservoir chamber of the remote reservoir using the Venturi effect when the shock piston moves from a rebound position into the compressed position. The eductor nozzle provides a converging first eductor end positioned proximal to the reservoir end of the reservoir tube, a diverging second eductor end positioned distal to the reservoir end of the reservoir tube, a constricted throat portion positioned between the first eductor end and second eductor end, and an eductor base positioned between the first eductor end and the reservoir end of the reservoir tube, the eductor base providing a plurality of eductor apertures positioned circumferentially about a sidewall of the eductor base. The second end of the reservoir housing provides a substantially concave eductor surface, with the eductor nozzle extending perpendicularly from a center of the concave eductor surface. The second end of the reservoir piston provides a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle. Thus, when the shock piston moves from the rebound position into the compressed position, shock fluid ejects through the second eductor end of the eductor nozzle, creating a low-pressure area around the eductor apertures, which promotes shock fluid circulation within the second reservoir chamber and improves cooling efficiency of the shock fluid.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
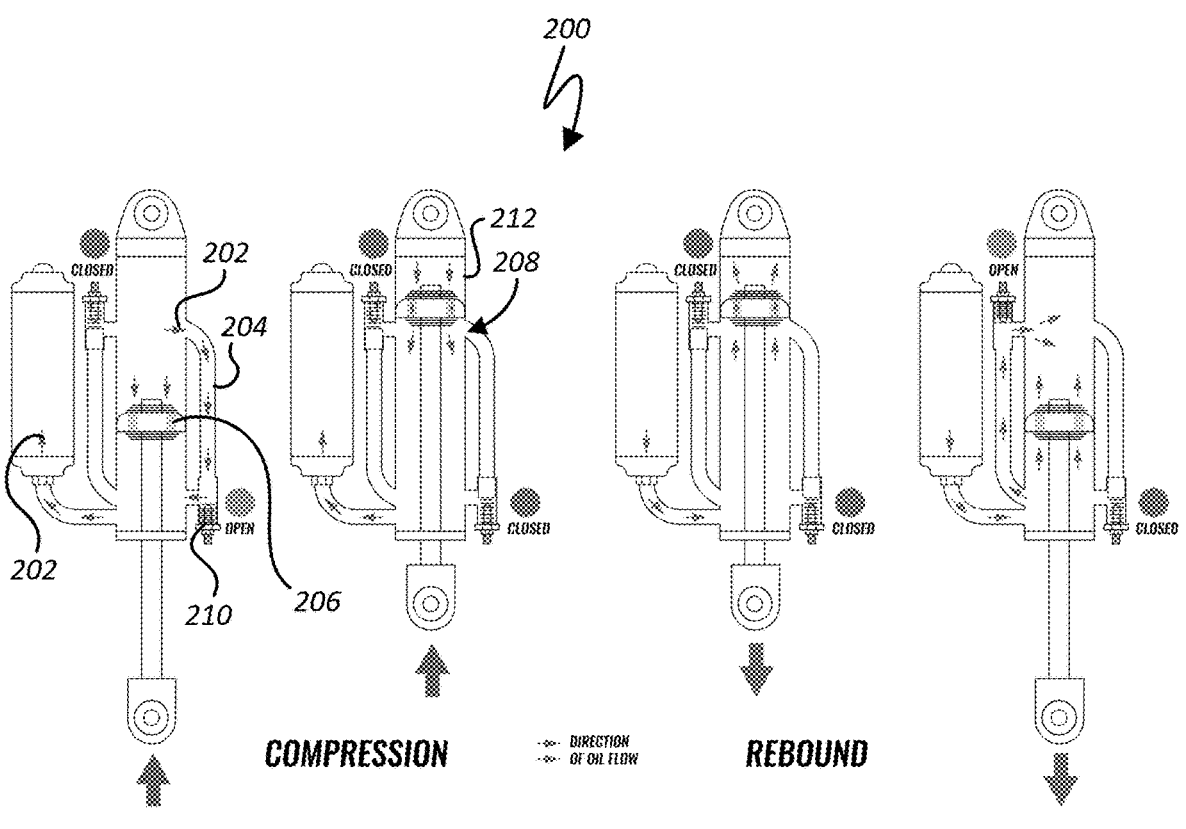
FIG. 1 is a diagrammatic view of a traditional vehicle bypass shock, in accordance with at least one embodiment.
Figure 2:
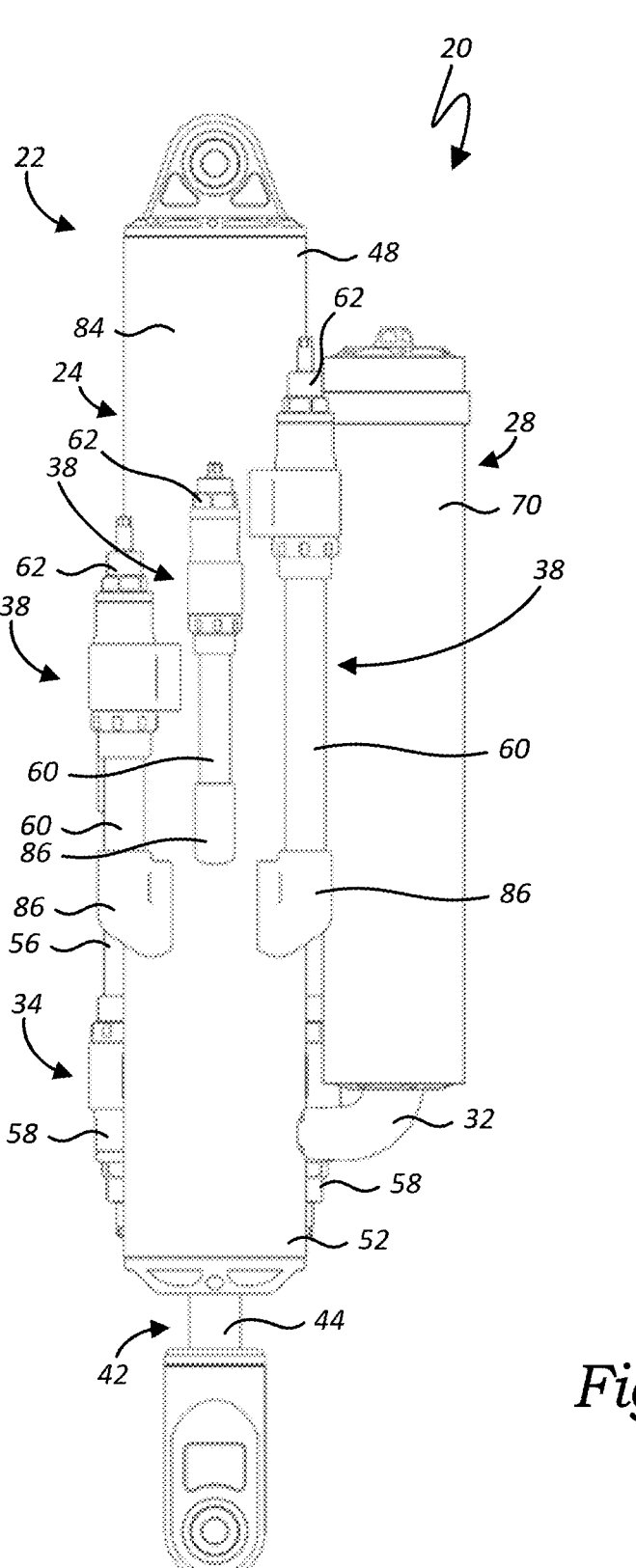
FIGS. 2 and 3 are perspective views of an exemplary external bypass apparatus integrated into an exemplary vehicle shock absorber, in accordance with at least one embodiment.
Figure 3:
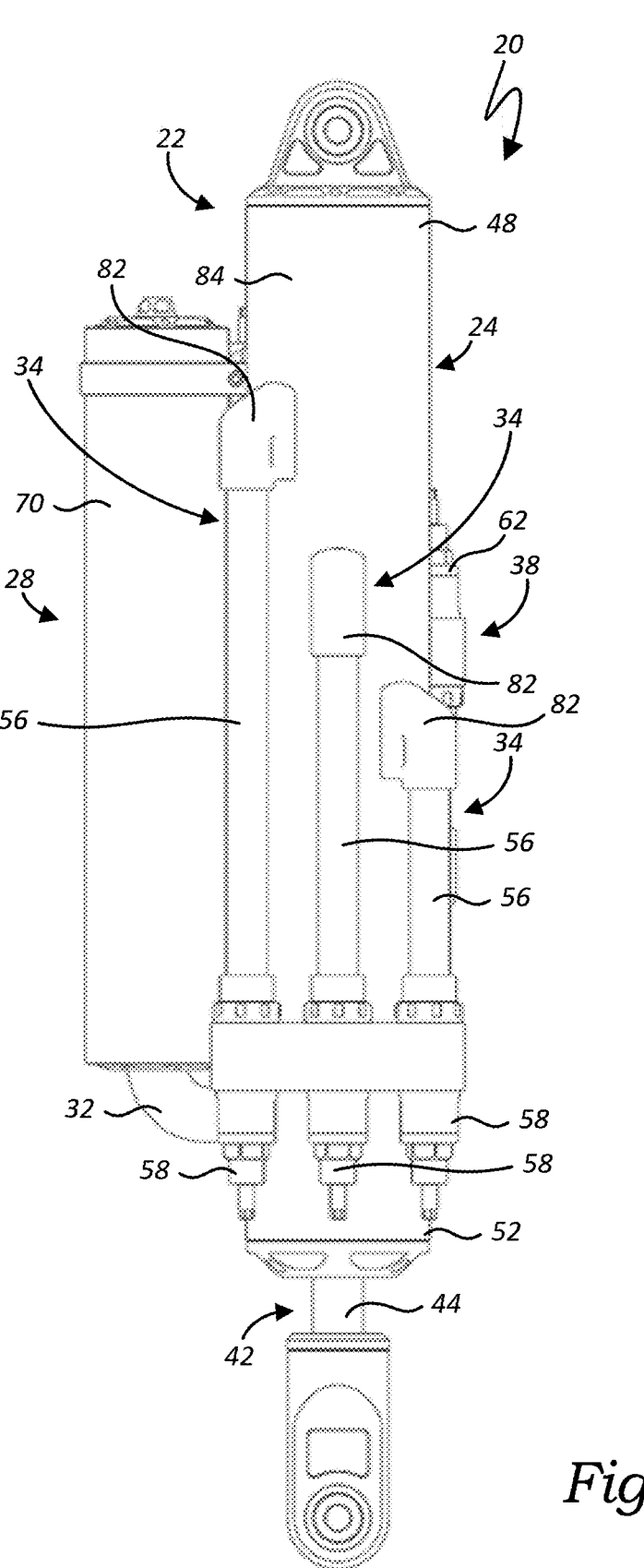
Figure 4:
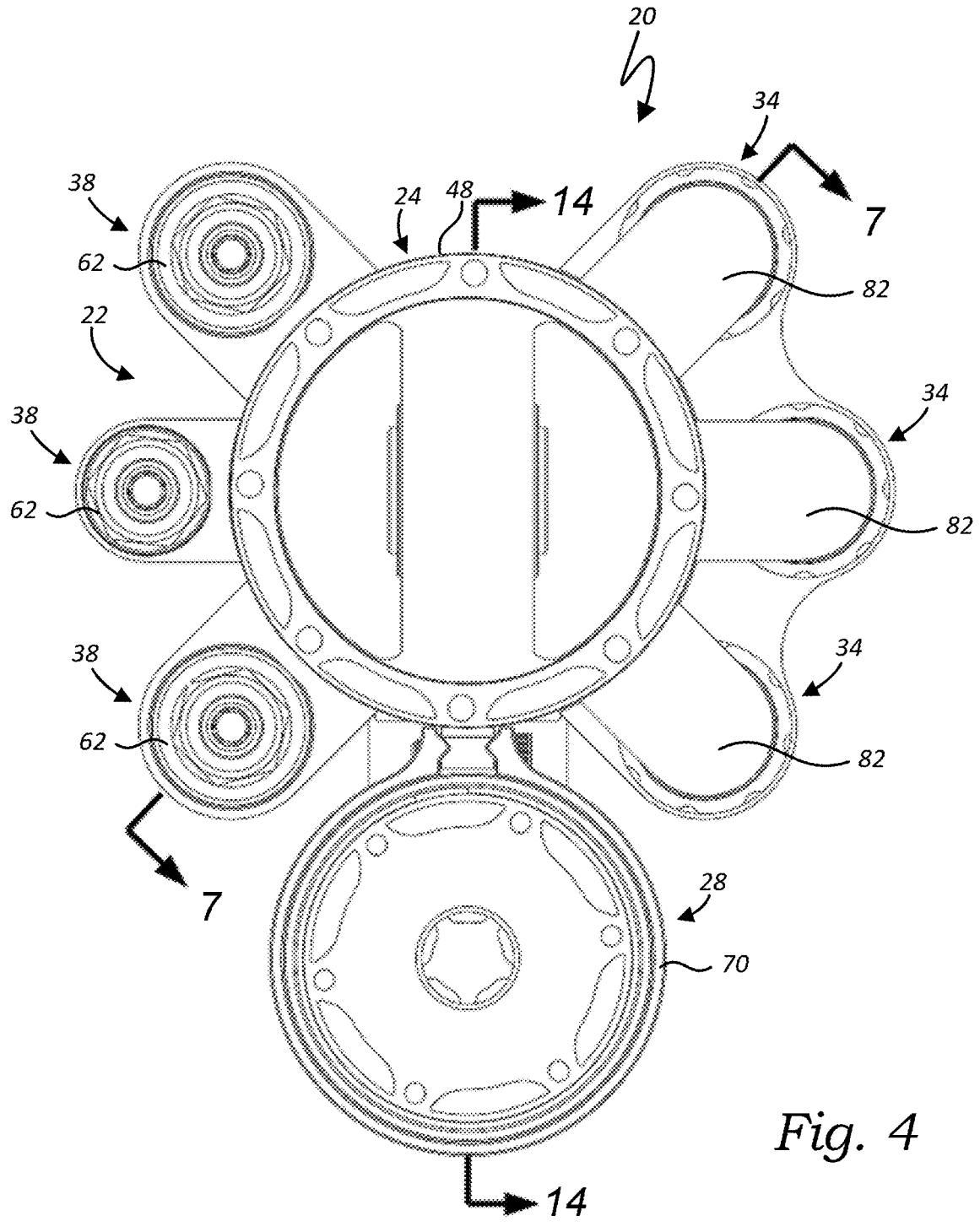
FIG. 4 is a top view thereof, in accordance with at least on embodiment.

Turning now to FIGS. 2-4, there is shown an exemplary external bypass apparatus 20 integrated into an exemplary vehicle shock absorber 22, in accordance with at least one embodiment. At the outset, it should be noted that while certain types of shock absorbers 22 might be shown for illustrative purposes, the apparatus 20 may be utilized in connection with shock absorbers 22 having any other sizes, shapes, dimensions and/or configurations, now known or later developed. Similarly, the various components of the apparatus 20 described herein may take on any other sizes, shapes, dimensions, configurations, quantities and/or relative positions, now known or later developed, so long as the apparatus 20 is capable of substantially carrying out the functionality described herein.

In at least one embodiment, the shock absorber 22 provides a substantially cylindrical shock housing 24 within which a shock piston 26 is positioned, a remote reservoir 28 (within which an internal floating reservoir piston 30 is positioned) in fluid communication with the shock housing 24 via a reservoir tube 32 and configured for cooling the shock housing 24 and allowing for greater suspension travel of the shock absorber 22, an at least one external compression bypass assembly 34 in fluid communication with the shock housing 24 and configured for allowing a volume of shock fluid 36 within the shock housing 24 to bypass the shock piston 26 as the shock piston 26 is moving into a compressed position, and an at least one external rebound bypass assembly 38 in fluid communication with the shock housing 24 and configured for allowing a volume of shock fluid 36 within the shock housing 24 to bypass the shock piston 26 as the shock piston 26 is moving into an opposing rebound position. In at least one embodiment, the shock piston 26 is coupled to a first end 40 of a piston rod 42, with an opposing second end 44 of the piston rod 42 extending outside the shock housing 24 and, for example, coupled to a location within the wheel well of a vehicle.

In at least one embodiment, the shock piston 26 divides the shock housing 24 into a first fluid chamber 46 positioned at a first end 48 of the shock housing 24 and a second fluid chamber 50 positioned at an opposing second end 52 of the shock housing 24. During the compression phase (i.e., as the shock piston 26 moves from the rebound position to the compressed position), the piston rod (and, in turn, the shock piston 26) is pushed/forced within the shock housing 24 in a direction toward the first end of the shock absorber 22. The shock fluid 36 from the first fluid chamber 46 is forced through compression channels 54 within the shock piston 26 before it flows into the second fluid chamber 50, while a volume of the shock fluid 36 within the first fluid chamber 46 bypasses the shock piston 26 and instead flows into the second fluid chamber 50 via a compression bypass tube 56 of the at least one compression bypass assembly 34. In at least one embodiment, as discussed further below, the at least one compression bypass assembly 34 provides a one-way compression bypass valve 58 positioned in line between the compression bypass tube 56 and the second fluid chamber 50, with the compression bypass valve 58 being configured for selectively regulating a flow rate of the shock fluid 36 passing through the compression bypass tube 56. Similarly, during the rebound phase (i.e., as the shock piston 26 moves from the compressed position to the rebound position), the piston rod 42 (and, in turn, the shock piston 26) is pulled within the shock housing 24 in a direction toward the second end 52 of the shock housing 24. The shock fluid 36 from the second fluid chamber 50 is forced through the compression channels 54 within the shock piston 26 before it flows into the first fluid chamber 46, while a volume of the shock fluid 36 within the second fluid chamber 50 bypasses the shock piston 26 and instead flows into the first fluid chamber 46 via a rebound bypass tube 60 of the at least one rebound bypass assembly 38. In at least one embodiment, as discussed further below, the at least one rebound bypass assembly 38 provides a one-way rebound bypass valve 62 positioned in line between the rebound bypass tube 60 and the first fluid chamber 46, with the rebound bypass valve 62 being configured for selectively regulating a flow rate of the shock fluid 36 passing through the rebound bypass tube 60. In at least one embodiment, an outer surface 64 of the shock piston 26 provides an at least one wear ring 66 positioned and configured for protecting an inner surface 68 of the shock housing 24 from scoring and abrasion as the shock piston 26 moves between the compressed position and rebound position.

In at least one embodiment, the remote reservoir 28 provides a substantially cylindrical reservoir housing 70 within which the reservoir piston 30 is positioned. The reservoir piston 30 divides the reservoir housing 70 into a first reservoir chamber 72 positioned at a first end 74 of the reservoir housing 70 and a second reservoir chamber 76 positioned at an opposing second end 78 of the reservoir housing 70. The second reservoir chamber 76 contains a volume of the shock fluid 36, and is in fluid communication with the second fluid chamber 50 of the shock housing 24 via the reservoir tube 32. A volume of a shock gas 80 (such as nitrogen, for example) is positioned within the first reservoir chamber 72 and configured for assisting in damping the shock absorber 22.

Figure 5:
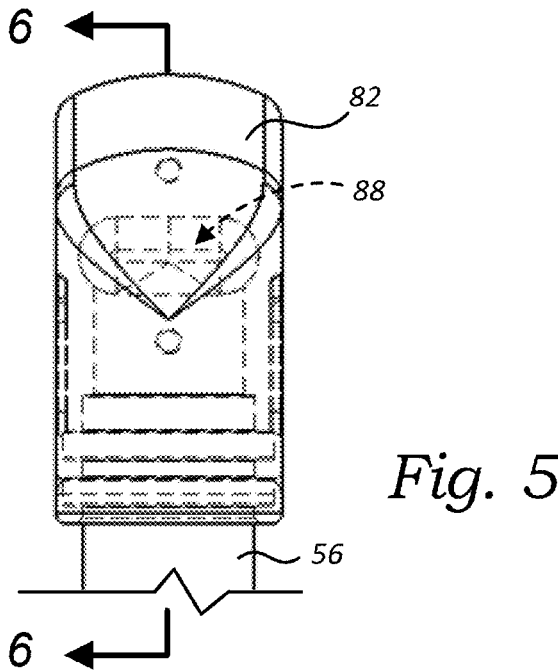
FIG. 5 is a partial perspective view of an exemplary compression bypass assembly of the apparatus, in accordance with at least one embodiment.
Figure 6:
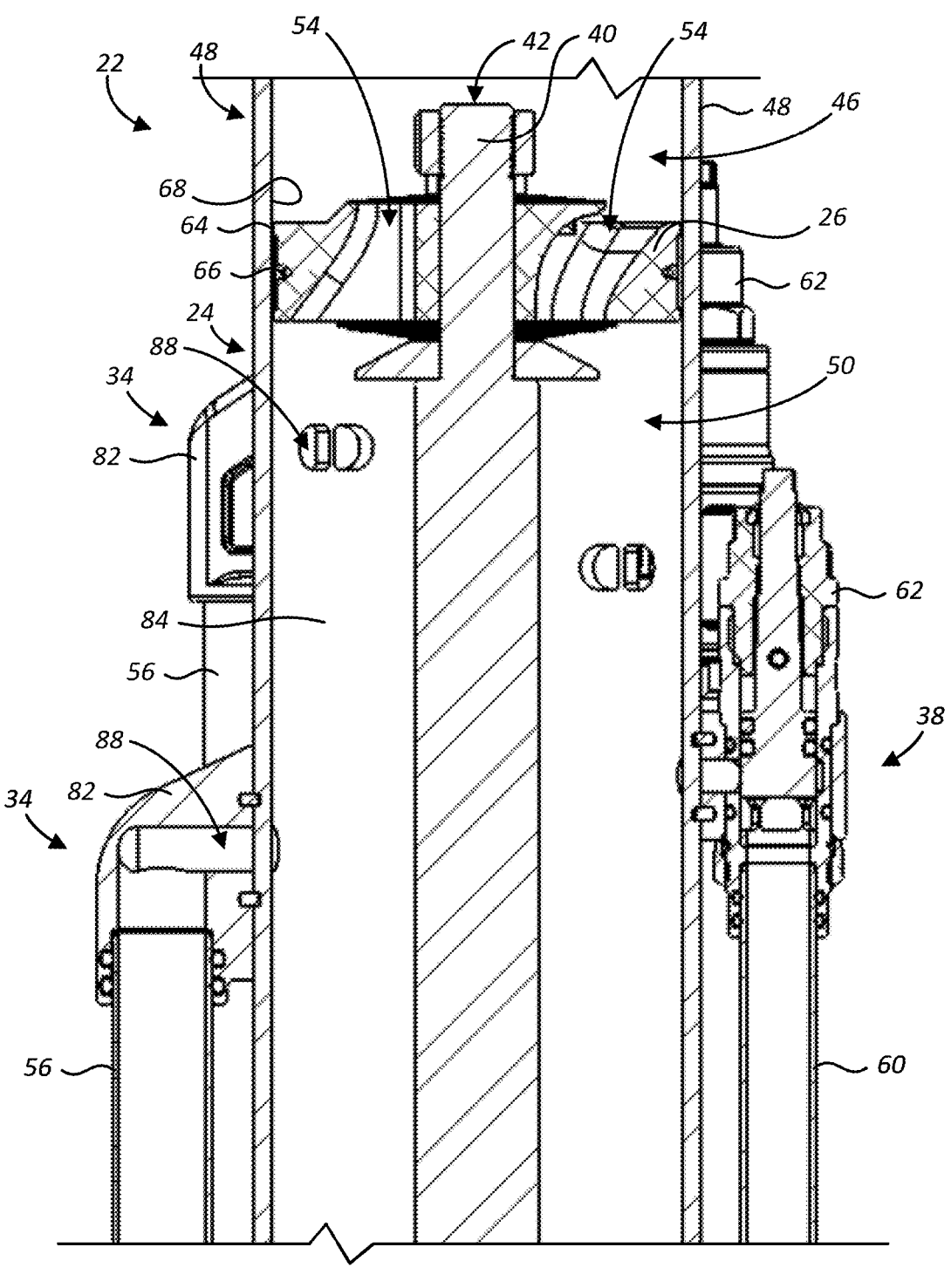
FIG. 6 is a cross-sectional view taken along line 6-6 of FIG. 5.
Figure 7:
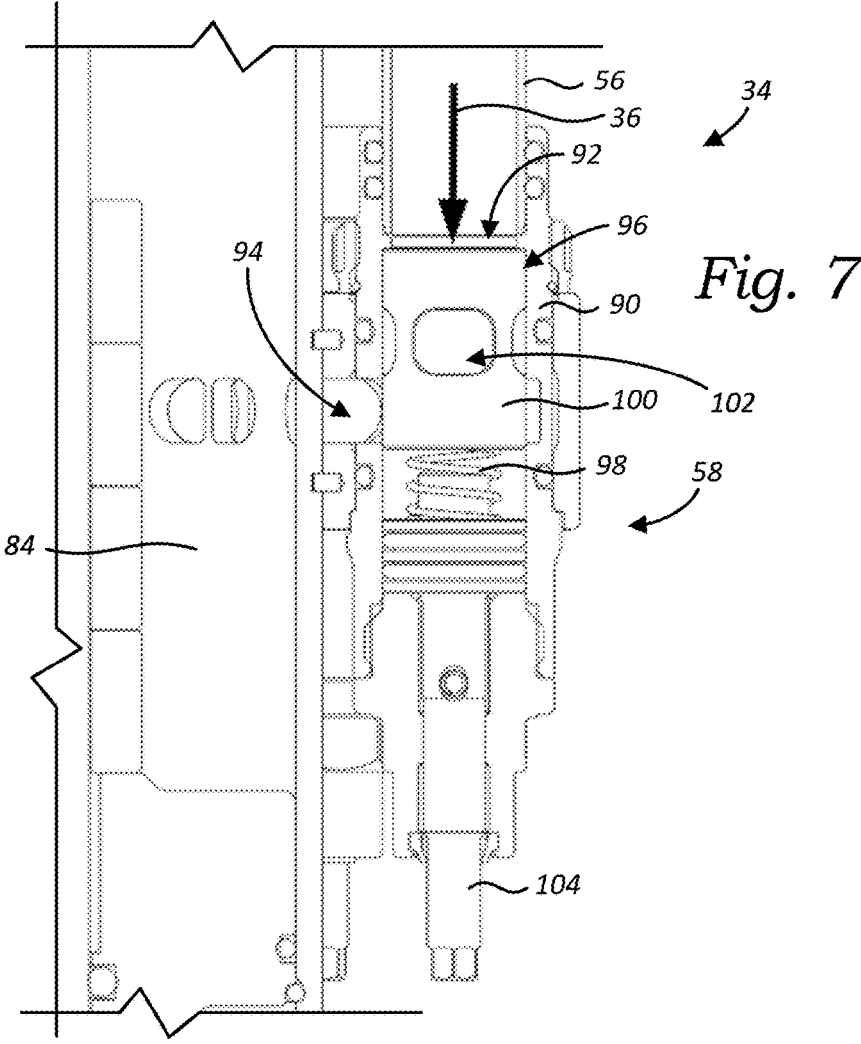
FIG. 7 is a further partial cross-sectional view of an exemplary compression bypass valve of the apparatus in a closed state, in accordance with at least one embodiment.
Figure 8:
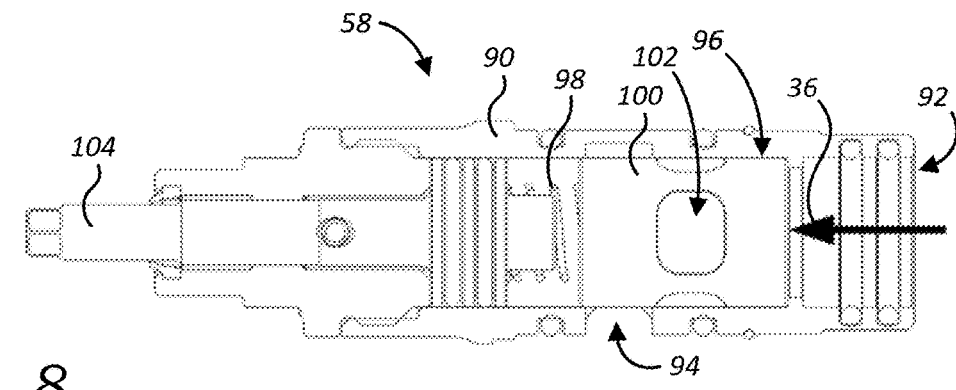
FIG. 8 is a diagrammatic view thereof, in accordance with at least one embodiment.
Figure 9:
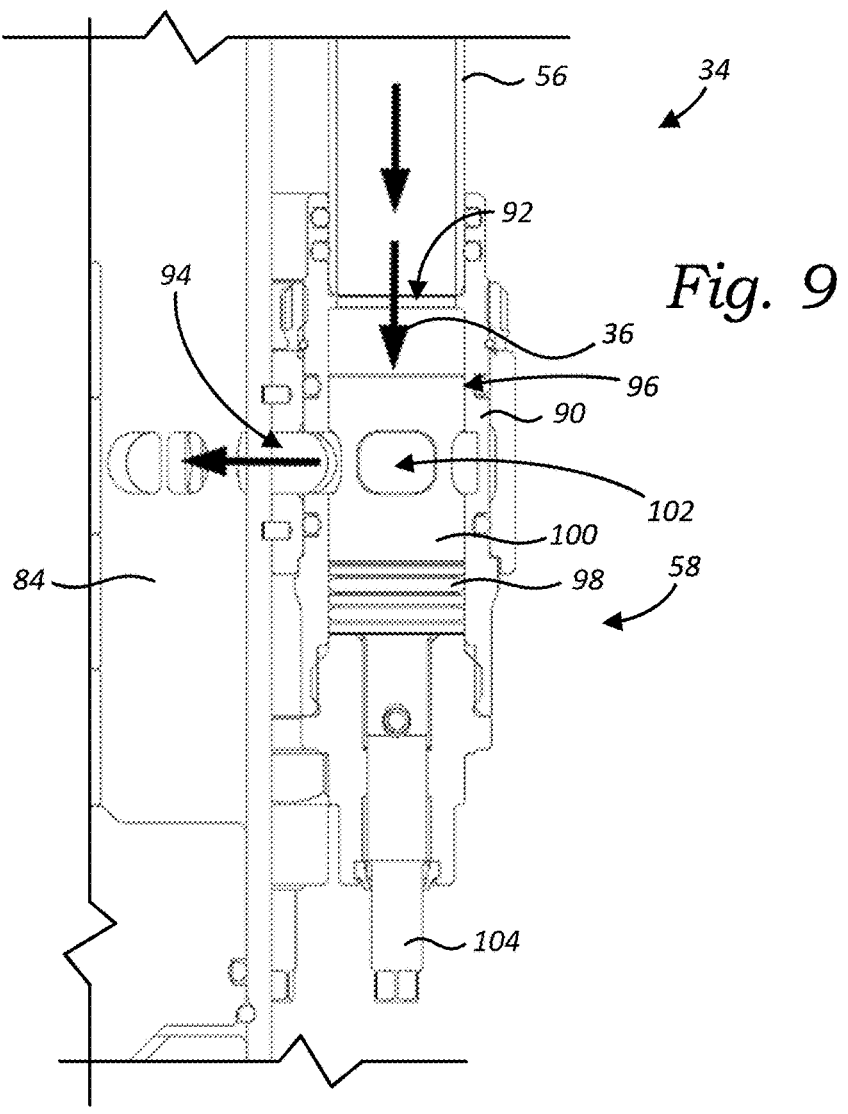
FIG. 9 is a partial cross-sectional view of the compression bypass valve in an open state, in accordance with at least one embodiment.
Figure 10:
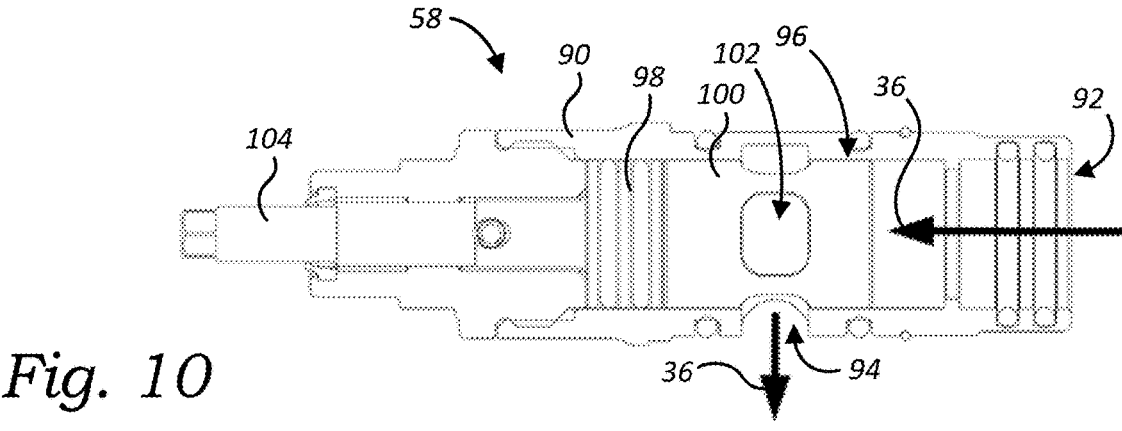
FIG. 10 is a diagrammatic view thereof, in accordance with at least one embodiment.

In at least one embodiment, the at least one compression bypass assembly 34 provides a compression bypass port 82 positioned within a housing wall 84 of the shock housing 24, in line between the compression bypass tube 56 and the first fluid chamber 46 of the shock housing 24, for establishing fluid communication therebetween. In at least one embodiment, as best illustrated in FIGS. 5 and 6, the compression bypass port 82 is oval-shaped, rather than the traditional circular shape. Similarly, in at least one embodiment, the at least one rebound bypass assembly 38 provides a rebound bypass port 86 positioned within the housing wall 84 of the shock housing 24, in line between the rebound bypass tube 60 and the second fluid chamber 50 of the shock housing 24, for establishing fluid communication therebetween. In at least one embodiment, the rebound bypass port 86 is oval-shaped, rather than a traditional circular shape. The oval shape of each of the compression bypass port 82 and rebound bypass port 86 allows for the bypass circuit created by the respective at least one compression bypass assembly 34 and rebound bypass assembly 38 to maximize flow capacity of the shock fluid 36 between the first fluid chamber 46 and second fluid chamber 50 while maintaining wear ring 66 support. Additionally, in at least one embodiment, the at least one compression bypass port 82 is positioned at a height relative to the housing wall 84 of the shock housing 24 such that the at least one compression bypass port 82 is positioned below the at least one wear ring 66 of the shock piston 26 when the shock piston 26 is in the compressed position. Similarly, in at least one embodiment, the at least one rebound bypass port 86 is positioned at a height relative to the housing wall 84 of the shock housing 24 such that the at least one rebound bypass port 86 is positioned above the at least one wear ring 66 of the shock piston 26 when the shock piston 26 is in the rebound position. Accordingly, in such embodiments, fluid continuity around the shock piston 26 is eliminated while the shock piston 26 transitions over the at least one compression bypass port 82 and rebound bypass port 86. In at least one embodiment, as best illustrated in FIG. 6, the at least one compression bypass port 82 provides a port bridge 88 spanning the compression bypass port 82 and having a width that is less than a width of the compression bypass port 82 itself, such that the port bridge 88 is capable of providing a supporting surface over which the at least one wear ring 66 may travel as the shock piston 26 moves between the compressed position and rebound position, while the compression bypass port 82 remains substantially unobstructed for allowing shock fluid 36 to pass therethrough. Similarly, in at least one embodiment, the at least one rebound bypass port 86 provides a port bridge 88 spanning the rebound bypass port 86 and having a width that is less than a width of the rebound bypass port 86 itself, such that the port bridge 88 is capable of providing a supporting surface over which the at least one wear ring 66 may travel as the shock piston 26 moves between the compressed position and rebound position, while the rebound bypass port 86 remains substantially unobstructed for allowing shock fluid 36 to pass therethrough.

In at least one embodiment, the compression bypass valve 58 of the at least one compression bypass assembly 34 is configured as a spool valve, rather than a traditional bypass valve configuration (which entails a conical or flat valve that seals on an annular surface inside the bypass valve body 90, simply plugging and un-plugging the bypass fluid circuit). Specifically, in at least one embodiment, as best illustrated in FIGS. 7-10, the compression bypass valve 58 provides a valve body 90 having an inlet port 92 in fluid communication with the compression bypass tube 56, an outlet port 94 in fluid communication with the second fluid chamber 50 of the shock housing 24, a hollow cylindrical spool 96 slidably positioned within the valve body 90, and a return spring 98 positioned within the valve body 90. An open end of the hollow spool 96 is in fluid communication with the inlet port 92, while a circumferential sidewall 100 of the spool 96 provides an at least one spool aperture 102 positioned and configured for temporarily allowing the shock fluid 36 to flow radially therethrough. The spool 96 is configured for slidably moving between an open position (FIGS. 9 and 10)—wherein the at least one spool aperture 102 is substantially aligned with the outlet port 94, thereby allowing the shock fluid 36 to flow from the inlet port 92, axially through the open end of the hollow spool 96, radially through the spool aperture 102, and subsequently through the outlet port 94—and a closed position (FIGS. 7 and 8)—wherein the at least one spool aperture 102 is not aligned with the outlet port 94, such that the sidewall 100 of the spool 96 obstructs the outlet port 94 and prevents the shock fluid 36 from flowing therethrough. The return spring 98 is configured for biasing the spool 96 into the closed position. In at least one embodiment, the spool 96 provides a plurality of spool apertures 102 positioned circumferentially about the sidewall 100 of the spool 96. In that regard, it should be noted that, in further embodiments, the spool apertures 102 may take on any other sizes, shapes, dimensions, quantities and/or relative positions, now known or later developed, beyond what is shown in the accompanying drawings, so long as the compression bypass valve 58 is capable of substantially carrying out the functionality described herein.

In at least one embodiment, the compression bypass valve 58 further provides an adjustment stopper 104 threadably engaged with the valve body 90 and in mechanical communication with the return spring 98 for allowing a spring force of the return spring 98 to be selectively manually adjusted which, in turn, adjusts the amount of axial overlap between the at least one spool aperture 102 and the outlet port 94 when the spool 96 is in the open position. In other words, the adjustment stopper 104 is configured for adjusting a flow capacity of the compression bypass valve 58. In addition to these mechanical benefits, there is a significant reduction of audible operation noise as compared to traditional bypass valves, which is a result of the spool 96 being a relatively tighter fit within the valve body 90 and only having two degrees of freedom.

Similarly, in at least one embodiment, the rebound bypass valve 62 of the at least one rebound bypass assembly 38 is also configured as a spool valve. Specifically, in at least one embodiment, similar to the compression bypass valve 58, the rebound bypass valve 62 provides a valve body 90 having an inlet port 92 in fluid communication with the rebound bypass tube 60, an outlet port 94 in fluid communication with the first fluid chamber 46 of the shock housing 24, a hollow cylindrical spool 96 slidably positioned within the valve body 90, and a return spring 98 positioned within the valve body 90. An open end of the hollow spool 96 is in fluid communication with the inlet port 92, while a circumferential sidewall 100 of the spool 96 provides an at least one spool aperture 102 positioned and configured for temporarily allowing the shock fluid 36 to flow radially therethrough. The spool 96 is configured for slidably moving between an open position—wherein the at least one spool aperture 102 is substantially aligned with the outlet port 94, thereby allowing the shock fluid 36 to flow from the inlet port 92, axially through the open end of the hollow spool 96, radially through the spool aperture 102, and subsequently through the outlet port 94—and a closed position—wherein the at least one spool aperture 102 is not aligned with the outlet port 94, such that the sidewall 100 of the spool 96 obstructs the outlet port 94 and prevents the shock fluid 36 from flowing therethrough. The return spring 98 is configured for biasing the spool 96 into the closed position. In at least one embodiment, the spool 96 provides a plurality of spool apertures 102 positioned circumferentially about the sidewall 100 of the spool 96. In that regard, it should be noted that, in further embodiments, the spool apertures 102 may take on any other sizes, shapes, dimensions, quantities and/or relative positions, now known or later developed, beyond what is shown in the accompanying drawings, so long as the rebound bypass valve 62 is capable of substantially carrying out the functionality described herein.

In at least one embodiment, similar to the compression bypass valve 58, the rebound bypass valve 62 also further provides an adjustment stopper 104 threadably engaged with the valve body 90 and in mechanical communication with the return spring 98 for allowing a spring force of the return spring 98 to be selectively manually adjusted which, in turn, adjusts the amount of axial overlap between the at least one spool aperture 102 and the outlet port 94 when the spool 96 is in the open position. In other words, the adjustment stopper 104 is configured for adjusting a flow capacity of the rebound bypass valve 62.

In at least one embodiment, the compression bypass valve 58 of the at least one compression bypass assembly 34 is a pilot-operated valve, such that the axial position and flow rate of the compression bypass valve 58 is a function of the pressure differential across the compression bypass valve 58, rather than being set by a hard stop. As a result, the compression bypass valve 58 will always flow the required amount of shock fluid 36 to achieve the prescribed differential, eliminating the occurrence of pressure spikes from sudden high amplitude suspension inputs. Additionally, in at least one embodiment, adjustments of the compression bypass valve 58 can be made on the fly by directly adjusting the flowrate out of a secondary chamber of the compression bypass valve 58 via a needle valve. This needle valve metering circuit may be operated by an electronic stepper motor or by electronic linear actuator to apply a prescribed rotational or linear displacement to the flow metering circuit.

Similarly, in at least one embodiment, the rebound bypass valve 62 of the at least one rebound bypass assembly 38 is also a pilot-operated valve, such that the axial position and flow rate of the compression bypass valve 58 is a function of the pressure differential across the compression bypass valve 58, rather than being set by a hard stop. As a result, the compression bypass valve 58 will always flow the required amount of shock fluid 36 to achieve the prescribed differential, eliminating the occurrence of pressure spikes from sudden high amplitude suspension inputs. Additionally, in at least one embodiment, adjustments of the compression bypass valve 58 can be made on the fly by directly adjusting the flowrate out of a secondary chamber of the compression bypass valve 58 via a needle valve. This needle valve metering circuit may be operated by an electronic stepper motor or by electronic linear actuator to apply a prescribed rotational or linear displacement to the flow metering circuit.

Figure 11:
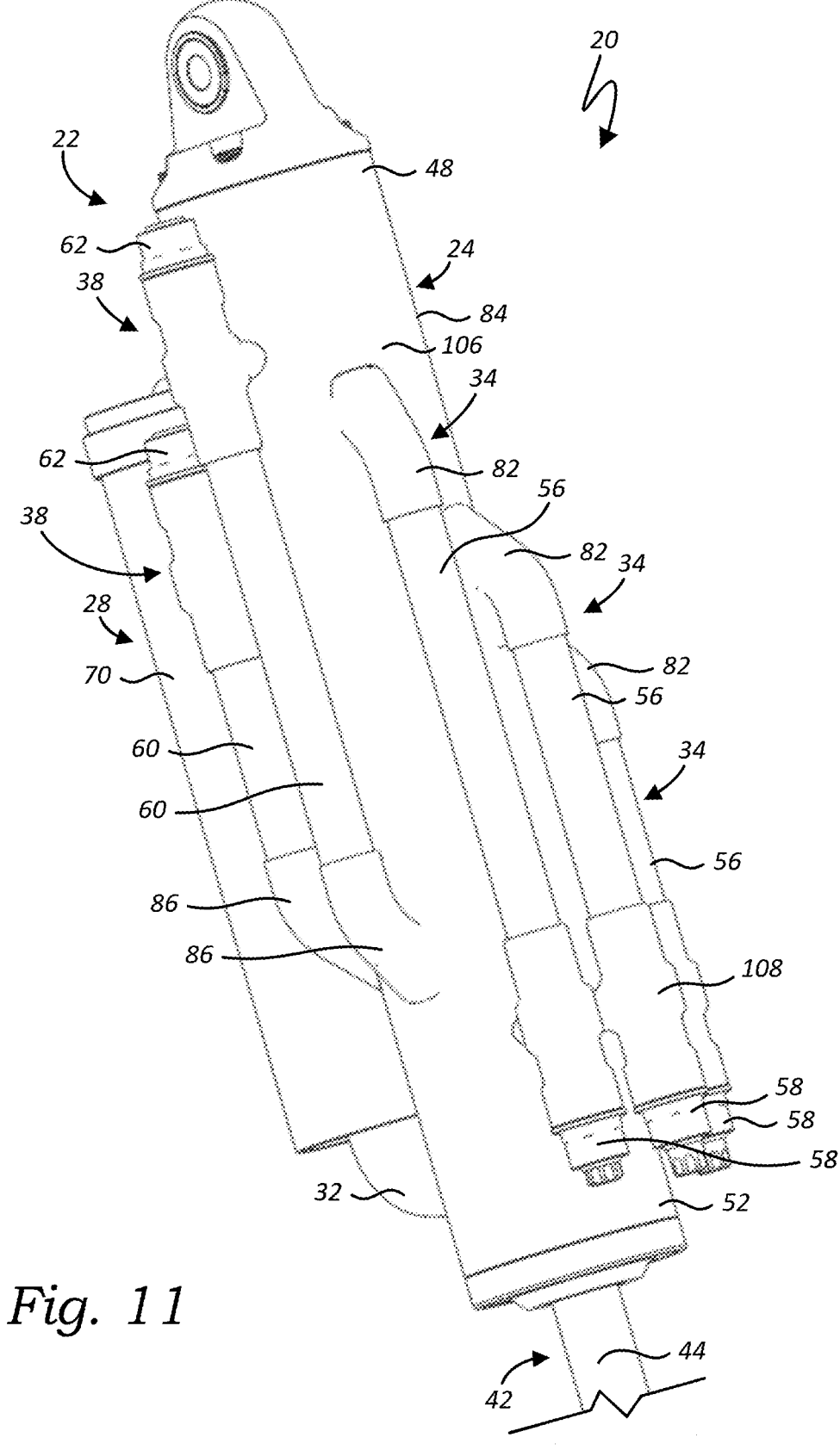
FIG. 11 is a partial perspective view of a further exemplary compression bypass assembly integrated into an exemplary vehicle shock absorber, in accordance with at least one embodiment.
Figure 12:
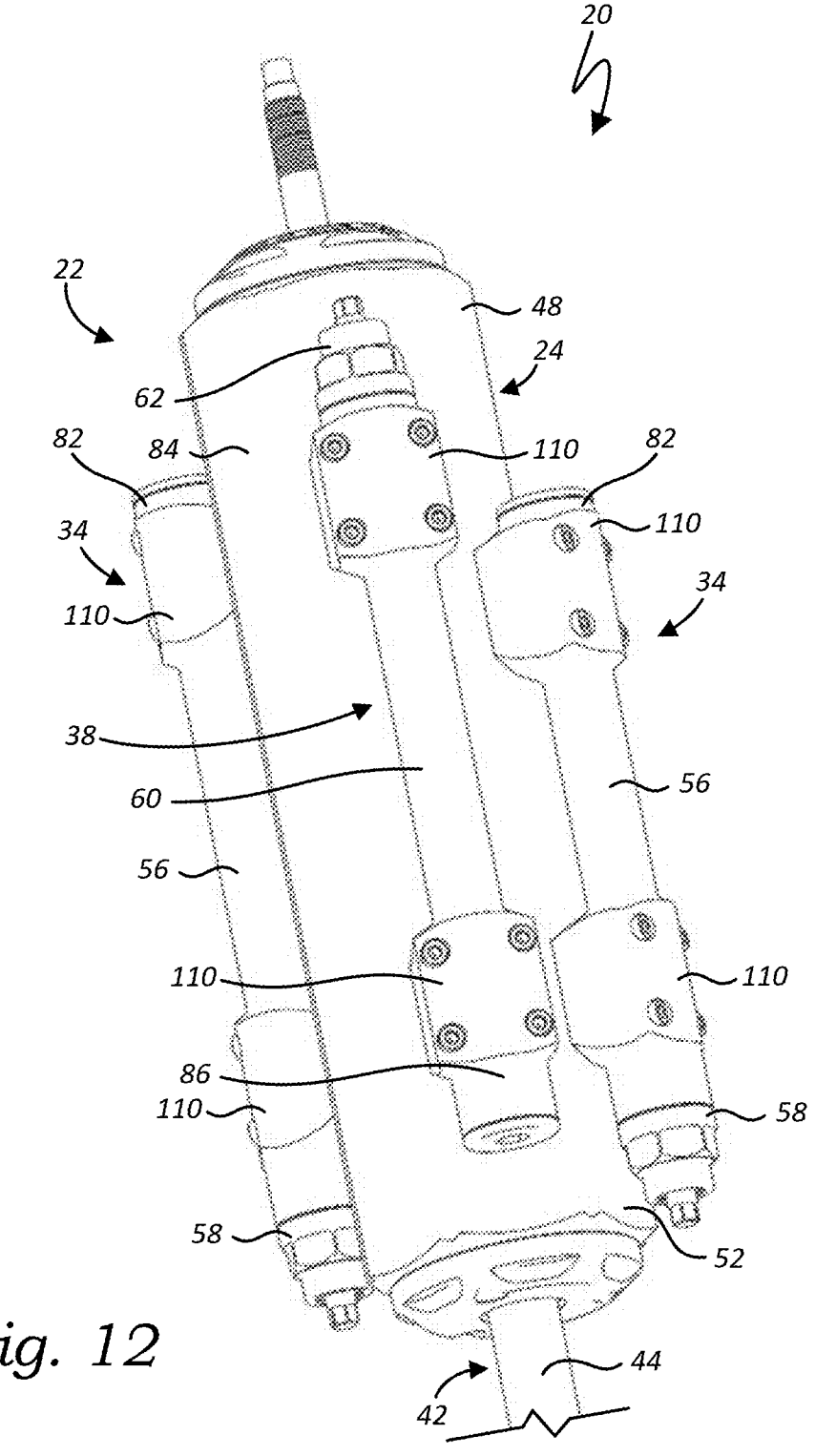
FIG. 12 is a perspective view of a still further exemplary compression bypass assembly integrated into an exemplary vehicle shock absorber, in accordance with at least one embodiment.
Figure 13:
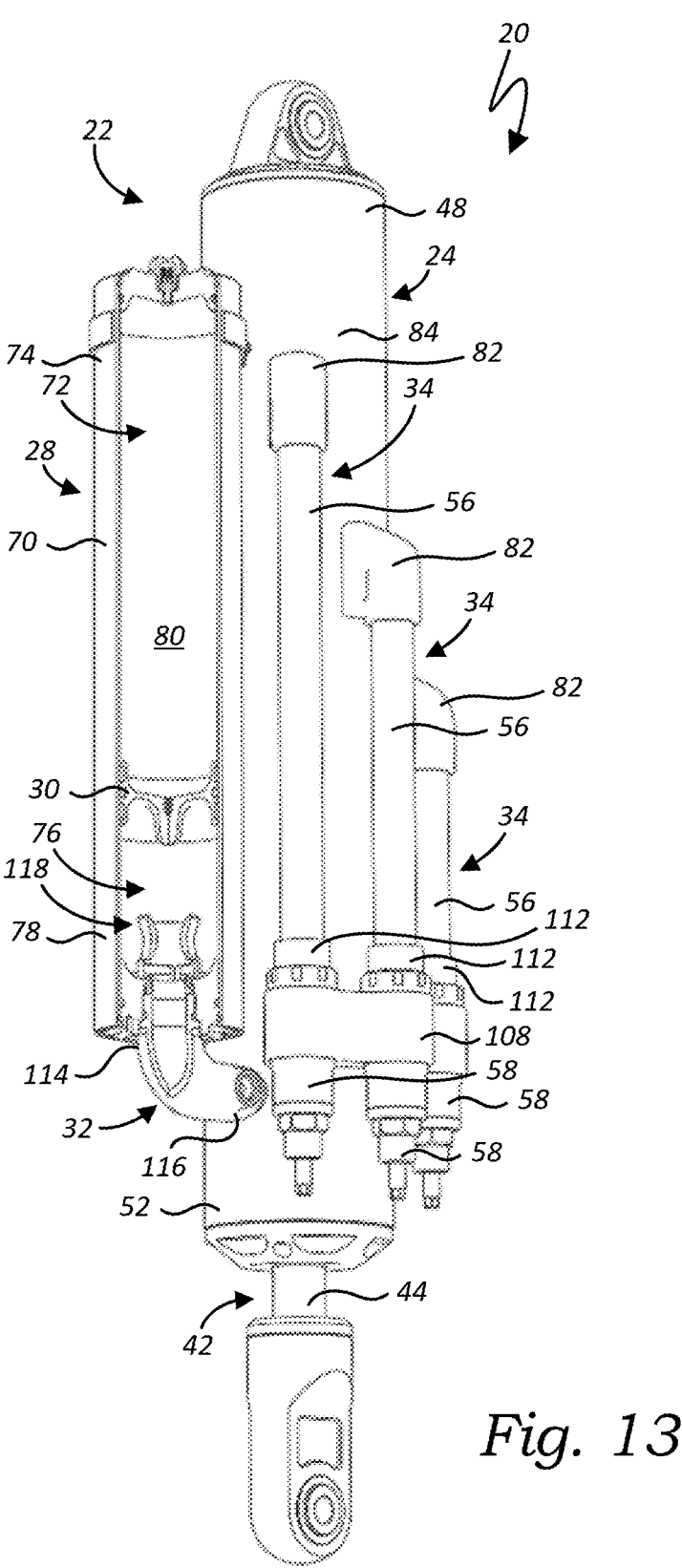
FIG. 13 is a perspective view of the apparatus with a portion of a remote reservoir of the apparatus cut away for illustrative purposes, in accordance with at least one embodiment.

In at least one embodiment, as illustrated in FIG. 11, one or both of the at least one compression bypass assembly 34 and rebound bypass assembly 38 are permanently secured to an outer surface 106 of the housing wall 84 of the shock housing 24 by welding the at least one compression bypass assembly 34 and rebound bypass assembly 38 directly to the outer surface 106 of the housing wall 84 of the shock housing 24. In at least one such embodiment, taking the compression bypass assembly 34 as an example, the compression bypass port 82 is welded to the outer surface 106 of the housing wall 84 of the shock housing 24; the compression bypass valve 58 is positioned within a valve holder 108 that is welded to the outer surface 106 of the housing wall 84 of the shock housing 24; and the compression bypass tube 56 is welded to each of the compression bypass port 82 and the valve holder 108. In at least one alternate embodiment, rather than being welded to each of the compression bypass port 82 and the valve holder 108, the compression bypass tube 56 is instead held captive between each of the compression bypass port 82 and the valve holder 108 by the inserted compression bypass valve 58 into the valve holder 108. Such an alternate embodiment allows for a greater level of positional tolerancing versus the traditionally welded components in the manufacturing process. This also provides new serviceability functions of the compression bypass tube 56 which is not possible in the traditional method. In such embodiments, dissimilar materials can also be utilized in the construction of the compression bypass assembly 34 components. In at least one further alternate embodiment, as best illustrated in FIG. 12, rather than the compression bypass port 82 and valve holder 108 being welded to the outer surface 106 of the housing wall 84 of the shock housing 24, they are instead engaged with the outer surface 106 of the housing wall 84 of the shock housing 24—either permanently or non-permanently—via an at least one attachment mechanism 110, such as a snap ring, threaded hardware, etc. In at least one still further alternate embodiment, as best illustrated in FIG. 13, the compression bypass tube 56 and compression bypass valve 58 are positioned within an outer bypass tube 112, with the outer bypass tube 112 being threadably engaged with the valve holder 108 and the compression bypass port 82 being engaged with the housing wall 84 of the shock housing 24 via an O-ring slip fit connection. It should be noted that the at least one rebound bypass assembly 38 may take on one or more of the above-described embodiments as well.

Figure 14:
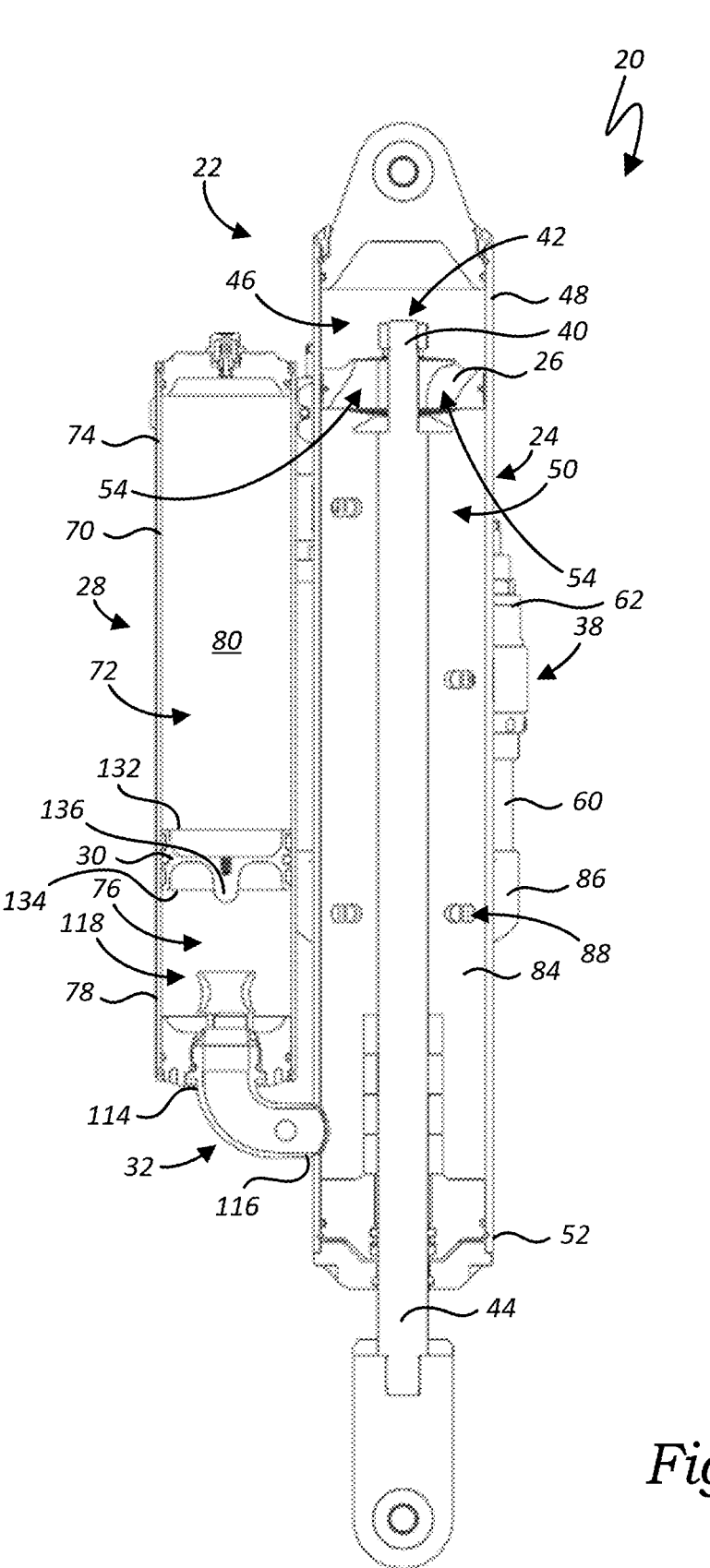
FIG. 14 is a cross-sectional view taken along line 14-14 of FIG. 4.
Figure 15:
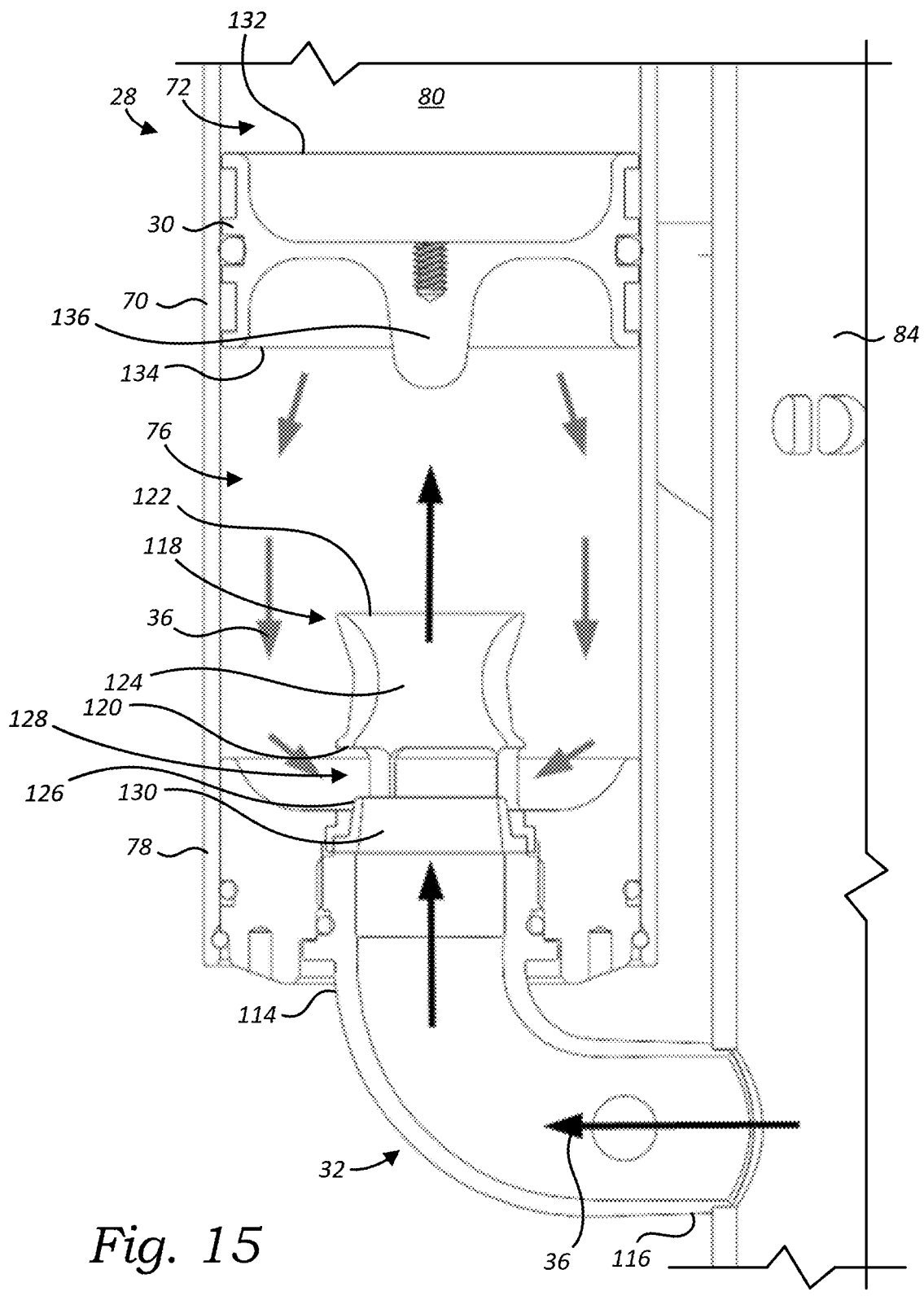
FIG. 15 is a diagrammatic view of an exemplary eductor nozzle of the apparatus, in accordance with at least one embodiment.

In at least one embodiment, as best illustrated in FIGS. 13-15, the remote reservoir 28 is in fluid communication with the shock housing 24 via a reservoir tube 32 and is configured for cooling the shock housing 24 and allowing for greater suspension travel of the shock absorber 22. In at least one embodiment, a reservoir end 114 of the reservoir tube 32 is positioned within the second reservoir chamber 76 of the remote reservoir 28, while an opposing shock end 116 of the reservoir tube 32 is positioned within the second fluid chamber 50 of the shock housing 24. Additionally, in at least one embodiment, the reservoir end 114 of the reservoir tube 32 provides an eductor nozzle 118 configured for introducing shock fluid 36 from the second fluid chamber 50 of the shock housing 24 into the second reservoir chamber 76 of the remote reservoir 28 using the Venturi effect when the shock piston 26 moves from the rebound position into the compressed position. In at least one embodiment, as best illustrated in FIG. 15, the eductor nozzle 118 provides a converging first eductor end 120, a diverging second eductor end 122, and a constricted throat portion 124 positioned between the first eductor end 120 and second eductor end 122. Accordingly, as shock fluid 36 enters the first eductor end 120 of the eductor nozzle 118 from the reservoir tube 32, the narrowing geometry of the first eductor end 120 causes the velocity of the shock fluid 36 to increase and the pressure to decrease. The high-velocity, low-pressure shock fluid 36 then enters the constricted throat portion 124, where the shock fluid 36 velocity is further increased. As the shock fluid 36 exits the throat portion 124, it enters the diverging second eductor end 122 of the eductor nozzle 118, where the shock fluid 36 velocity decreases and its pressure increases. This creates a region of low pressure in the eductor nozzle 118. The shock fluid 36 is then discharged from the second eductor end 122 of the eductor nozzle 118, into the remote reservoir 28. In at least one embodiment, the eductor nozzle 118 further provides an eductor base 126 positioned between the first eductor end 120 of the eductor nozzle 118 and the reservoir end 114 of the reservoir tube 32. In at least one such embodiment, the eductor base 126 provides a plurality of eductor apertures 128 positioned circumferentially about a sidewall 130 of the eductor base 126 and configured for circulating the shock fluid 36 within the second reservoir chamber 76, as discussed further below. In that regard, it should be noted that, in further embodiments, the eductor apertures 128 may take on any other sizes, shapes, dimensions, quantities and/or relative positions, now known or later developed, beyond what is shown in the accompanying drawings, so long as the eductor nozzle 118 is capable of substantially carrying out the functionality described herein.

In at least one embodiment, as mentioned above, the internal floating reservoir piston 30 within the remote reservoir 28 divides the reservoir housing 70 into a first reservoir chamber 72 positioned at a first end 74 of the reservoir housing 70 and a second reservoir chamber 76 positioned at an opposing second end 78 of the reservoir housing 70. Accordingly, a first end 132 of the reservoir piston 30 is positioned within the first reservoir chamber 72, while an opposing second end 134 of the reservoir piston 30 is positioned within the second reservoir chamber 76. In at least one embodiment, the second end 78 of the reservoir housing 70 provides a substantially concave surface, with the eductor nozzle 118 extending perpendicularly from a center of the concave surface. Additionally, in at least one embodiment, the second end 134 of the reservoir piston 30 provides a substantially concave surface, longitudinally opposing the concave surface of the second end 78 of the reservoir housing 70, with a rounded, substantially cylindrical protrusion 136 extending perpendicularly from a center of the concave surface, such that the protrusion 136 is axially aligned with the second eductor end 122 of the eductor nozzle 118. As a result, as illustrated in FIG. 15, when the shock piston 26 moves from the rebound position into the compressed position, shock fluid 36 ejects through the second eductor end 122 of the eductor nozzle 118, creating a low-pressure area around the eductor apertures 128, which promotes shock fluid 36 circulation within the second reservoir chamber 76. This increased circulation also ensures the thermal boundary layer in the shock fluid 36 is kept to a minimum, thus keeping convective heat transfer from the shock fluid 36 to the metal body of the remote reservoir 28 to a maximum which, in turn, improves cooling efficiency.

Aspects of the present specification may also be described as the following embodiments:

1. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising: an at least one compression bypass assembly external to and in fluid communication with the shock housing, the at least one compression bypass assembly comprising: a compression bypass tube positioned in line between the first fluid chamber and second fluid chamber of the shock housing for allowing a volume of shock fluid within the first fluid chamber to bypass the shock piston as the shock piston moves into a compressed position; an oval-shaped compression bypass port positioned within a housing wall of the shock housing, in line between the first fluid chamber of the shock housing and the compression bypass tube, for establishing fluid communication therebetween; and a one-way compression bypass valve positioned in line between the compression bypass tube and the second fluid chamber for selectively regulating a flow rate of the shock fluid passing through the compression bypass tube into the second fluid chamber, the compression bypass valve comprising: a valve body providing an inlet port in fluid communication with the compression bypass tube and an outlet port in fluid communication with the second fluid chamber of the shock housing; a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough; a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position.

2. The external bypass apparatus according to embodiment 1, wherein the shock piston is coupled to a first end of a piston rod, with an opposing second end of the piston rod extending outside the shock housing.

3. The external bypass apparatus according to embodiments 1-2, further comprising an at least one rebound bypass assembly external to and in fluid communication with the shock housing, the at least one rebound bypass assembly comprising: a rebound bypass tube positioned in line between the second fluid chamber and first fluid chamber of the shock housing for allowing a volume of shock fluid within the second fluid chamber to bypass the shock piston as the shock piston moves into a rebound position; an oval-shaped rebound bypass port positioned within the housing wall of the shock housing, in line between the second fluid chamber of the shock housing and the rebound bypass tube, for establishing fluid communication therebetween; and a one-way rebound bypass valve positioned in line between the rebound bypass tube and the first fluid chamber for selectively regulating a flow rate of the shock fluid passing through the rebound bypass tube into the first fluid chamber, the rebound bypass valve comprising: a valve body providing an inlet port in fluid communication with the rebound bypass tube and an outlet port in fluid communication with the first fluid chamber of the shock housing; a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position— wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough; a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position.

4. The external bypass apparatus according to embodiments 1-3, wherein the rebound bypass port of the at least one rebound bypass assembly is positioned at a height relative to the housing wall of the shock housing that is above an at least one wear ring of the shock piston when the shock piston is in the rebound position.

5. The external bypass apparatus according to embodiments 1-4, wherein the rebound bypass port of the at least one rebound bypass assembly provides a port bridge spanning the rebound bypass port and having a width that is less than a width of the rebound bypass port itself, such that the port bridge is capable of providing a supporting surface over which an at least one wear ring of the shock piston may travel as the shock piston moves between the compressed position and rebound position, while the rebound bypass port remains substantially unobstructed for allowing shock fluid to pass therethrough.

6. The external bypass apparatus according to embodiments 1-5, wherein the rebound bypass valve of the at least one rebound bypass assembly is a pilot-operated valve, whereby an axial position and flow rate of the rebound bypass valve is a function of a pressure differential across the rebound bypass valve.

7. The external bypass apparatus according to embodiments 1-6, wherein the at least one compression bypass assembly is permanently secured to an outer surface of the housing wall of the shock housing.

8. The external bypass apparatus according to embodiments 1-7, wherein: the compression bypass port of the at least one compression bypass assembly is secured to an outer surface of the housing wall of the shock housing; the compression bypass valve of the at least one compression bypass assembly is positioned within a valve holder that is secured to the outer surface of the housing wall of the shock housing; and the compression bypass tube of the at least one compression bypass assembly is engaged with each of the compression bypass port and the valve holder.

9. The external bypass apparatus according to embodiments 1-8, wherein the compression bypass tube of the at least one compression bypass assembly is held captive between each of the compression bypass port and the valve holder by the inserted compression bypass valve into the valve holder.

10. The external bypass apparatus according to embodiments 1-9, wherein one or both of the compression bypass port and valve holder of the at least one compression bypass assembly is secured to the outer surface of the housing wall of the shock housing using a non-permanent attachment mechanism.

11. The external bypass apparatus according to embodiments 1-10, wherein: the compression bypass tube and compression bypass valve of the at least one compression bypass assembly are positioned within an outer bypass tube; the outer bypass tube is threadably engaged with the valve holder; and the compression bypass port of the at least one compression bypass assembly is engaged with the housing wall of the shock housing via an O-ring slip fit connection.

12. The external bypass apparatus according to embodiments 1-11, wherein the compression bypass port of the at least one compression bypass assembly is positioned at a height relative to the housing wall of the shock housing that is below an at least one wear ring of the shock piston when the shock piston is in the compressed position.

13. The external bypass apparatus according to embodiments 1-12, wherein the compression bypass port of the at least one compression bypass assembly provides a port bridge spanning the compression bypass port and having a width that is less than a width of the compression bypass port itself, such that the port bridge is capable of providing a supporting surface over which an at least one wear ring of the shock piston may travel as the shock piston moves between the compressed position and rebound position, while the compression bypass port remains substantially unobstructed for allowing shock fluid to pass therethrough.

14. The external bypass apparatus according to embodiments 1-13, wherein the compression bypass valve of the at least one compression bypass assembly is a pilot-operated valve, whereby an axial position and flow rate of the compression bypass valve is a function of a pressure differential across the compression bypass valve.

15. The external bypass apparatus according to embodiments 1-14, wherein the at least one compression bypass assembly is permanently secured to an outer surface of the housing wall of the shock housing.

16. The external bypass apparatus according to embodiments 1-15, wherein: the compression bypass port of the at least one compression bypass assembly is secured to an outer surface of the housing wall of the shock housing; the compression bypass valve of the at least one compression bypass assembly is positioned within a valve holder that is secured to the outer surface of the housing wall of the shock housing; and the compression bypass tube of the at least one compression bypass assembly is engaged with each of the compression bypass port and the valve holder.

17. The external bypass apparatus according to embodiments 1-16, wherein the compression bypass tube of the at least one compression bypass assembly is held captive between each of the compression bypass port and the valve holder by the inserted compression bypass valve into the valve holder.

18. The external bypass apparatus according to embodiments 1-17, wherein one or both of the compression bypass port and valve holder of the at least one compression bypass assembly is secured to the outer surface of the housing wall of the shock housing using a non-permanent attachment mechanism.

19. The external bypass apparatus according to embodiments 1-18, wherein: the compression bypass tube and compression bypass valve of the at least one compression bypass assembly are positioned within an outer bypass tube; the outer bypass tube is threadably engaged with the valve holder; and the compression bypass port of the at least one compression bypass assembly is engaged with the housing wall of the shock housing via an O-ring slip fit connection.

20. The external bypass apparatus according to embodiments 1-19, further comprising a remote reservoir comprising: a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber; the first reservoir chamber containing a volume of a shock gas; the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing; the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising: a converging first eductor end positioned proximal to the reservoir end of the reservoir tube; a diverging second eductor end positioned distal to the reservoir end of the reservoir tube; a constricted throat portion positioned between the first eductor end and second eductor end; and an eductor base positioned between the first eductor end and the reservoir end of the reservoir tube, the eductor base providing a plurality of eductor apertures positioned circumferentially about a sidewall of the eductor base; the second end of the reservoir housing providing a substantially concave eductor surface, with the eductor nozzle extending perpendicularly from a center of the concave eductor surface; the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle; whereby, when the shock piston moves from the rebound position into the compressed position, shock fluid ejects through the second eductor end of the eductor nozzle, creating a low-pressure area around the eductor apertures, which promotes shock fluid circulation within the second reservoir chamber and improves cooling efficiency of the shock fluid.

21. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising: a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber; the first reservoir chamber containing a volume of a shock gas; the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing; the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising: a converging first eductor end positioned proximal to the reservoir end of the reservoir tube; a diverging second eductor end positioned distal to the reservoir end of the reservoir tube; a constricted throat portion positioned between the first eductor end and second eductor end; and an eductor base positioned between the first eductor end and the reservoir end of the reservoir tube, the eductor base providing a plurality of eductor apertures positioned circumferentially about a sidewall of the eductor base; the second end of the reservoir housing providing a substantially concave eductor surface, with the eductor nozzle extending perpendicularly from a center of the concave eductor surface; the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle; whereby, when the shock piston moves from the rebound position into the compressed position, shock fluid ejects through the second eductor end of the eductor nozzle, creating a low-pressure area around the eductor apertures, which promotes shock fluid circulation within the second reservoir chamber and improves cooling efficiency of the shock fluid and, in turn, the shock housing.

22. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising: an at least one compression bypass assembly external to and in fluid communication with the shock housing, the at least one compression bypass assembly comprising: a compression bypass tube positioned in line between the first fluid chamber and second fluid chamber of the shock housing for allowing a volume of shock fluid within the first fluid chamber to bypass the shock piston as the shock piston moves into a compressed position; an oval-shaped compression bypass port positioned within a housing wall of the shock housing, in line between the first fluid chamber of the shock housing and the compression bypass tube, for establishing fluid communication therebetween; and a one-way compression bypass valve positioned in line between the compression bypass tube and the second fluid chamber for selectively regulating a flow rate of the shock fluid passing through the compression bypass tube into the second fluid chamber, the compression bypass valve comprising: a valve body providing an inlet port in fluid communication with the compression bypass tube and an outlet port in fluid communication with the second fluid chamber of the shock housing; a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough; a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position; and a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber; the first reservoir chamber containing a volume of a shock gas; the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing; the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising: a converging first eductor end positioned proximal to the reservoir end of the reservoir tube; a diverging second eductor end positioned distal to the reservoir end of the reservoir tube; a constricted throat portion positioned between the first eductor end and second eductor end; and an eductor base positioned between the first eductor end and the reservoir end of the reservoir tube, the eductor base providing a plurality of eductor apertures positioned circumferentially about a sidewall of the eductor base; the second end of the reservoir housing providing a substantially concave eductor surface, with the eductor nozzle extending perpendicularly from a center of the concave eductor surface; and the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle.

In closing, regarding the exemplary embodiments of the present invention as shown and described herein, it will be appreciated that an improved external bypass apparatus for vehicle shock absorbers is disclosed. Because the principles of the invention may be practiced in a number of configurations beyond those shown and described, it is to be understood that the invention is not in any way limited by the exemplary embodiments, but is generally directed to an external bypass apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any methods disclosed herein, along with the order in which the respective elements of any such method are performed, are purely exemplary.

Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicant and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising:

an at least one compression bypass assembly external to and in fluid communication with the shock housing, the at least one compression bypass assembly comprising:

a compression bypass tube positioned in line between the first fluid chamber and second fluid chamber of the shock housing for allowing a volume of shock fluid within the first fluid chamber to bypass the shock piston as the shock piston moves into a compressed position;

an oval-shaped compression bypass port positioned within a housing wall of the shock housing, in line between the first fluid chamber of the shock housing and the compression bypass tube, for establishing fluid communication therebetween; and a one-way compression bypass valve positioned in line between the compression bypass tube and the second fluid chamber for selectively regulating a flow rate of the shock fluid passing through the compression bypass tube into the second fluid chamber, the compression bypass valve comprising:

a valve body providing an inlet port in fluid communication with the compression bypass tube and an outlet port in fluid communication with the second fluid chamber of the shock housing;

21 a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough;

a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position.

2. The external bypass apparatus of claim 1, further comprising an at least one rebound bypass assembly external to and in fluid communication with the shock housing, the at least one rebound bypass assembly comprising:

a rebound bypass tube positioned in line between the second fluid chamber and first fluid chamber of the shock housing for allowing a volume of shock fluid within the second fluid chamber to bypass the shock piston as the shock piston moves into a rebound position;

an oval-shaped rebound bypass port positioned within the housing wall of the shock housing, in line between the second fluid chamber of the shock housing and the rebound bypass tube, for establishing fluid communication therebetween; and a one-way rebound bypass valve positioned in line between the rebound bypass tube and the first fluid chamber for selectively regulating a flow rate of the shock fluid passing through the rebound bypass tube into the first fluid chamber, the rebound bypass valve comprising:

a valve body providing an inlet port in fluid communication with the rebound bypass tube and an outlet port in fluid communication with the first fluid chamber of the shock housing;

a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough;

a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position.

3. The external bypass apparatus of claim 2, wherein the rebound bypass port of the at least one rebound bypass assembly is positioned at a height relative to the housing wall of the shock housing that is above an at least one wear ring of the shock piston when the shock piston is in the rebound position.

4. The external bypass apparatus of claim 2, wherein the rebound bypass port of the at least one rebound bypass assembly provides a port bridge spanning the rebound bypass port and having a width that is less than a width of the rebound bypass port itself, such that the port bridge is capable of providing a supporting surface over which an at least one wear ring of the shock piston may travel as the shock piston moves between the compressed position and rebound position, while the rebound bypass port remains substantially unobstructed for allowing shock fluid to pass therethrough.

5. The external bypass apparatus of claim 2, wherein the rebound bypass valve of the at least one rebound bypass assembly is a pilot-operated valve, whereby an axial position and flow rate of the rebound bypass valve is a function of a pressure differential across the rebound bypass valve.

6. The external bypass apparatus of claim 2, wherein:

the compression bypass port of the at least one compression bypass assembly is secured to an outer surface of the housing wall of the shock housing;

the compression bypass valve of the at least one compression bypass assembly is positioned within a valve holder that is secured to the outer surface of the housing wall of the shock housing; and the compression bypass tube of the at least one compression bypass assembly is engaged with each of the compression bypass port and the valve holder.

7. The external bypass apparatus of claim 6, wherein the compression bypass tube of the at least one compression bypass assembly is held captive between each of the compression bypass port and the valve holder by the inserted compression bypass valve into the valve holder.

8. The external bypass apparatus of claim 6, wherein one or both of the compression bypass port and valve holder of the at least one compression bypass assembly is secured to the outer surface of the housing wall of the shock housing using a non-permanent attachment mechanism.

9. The external bypass apparatus of claim 6, wherein:

the compression bypass tube and compression bypass valve of the at least one compression bypass assembly are positioned within an outer bypass tube;

the outer bypass tube is threadably engaged with the valve holder; and the compression bypass port of the at least one compression bypass assembly is engaged with the housing wall of the shock housing via an O-ring slip fit connection.

10. The external bypass apparatus of claim 1, wherein the compression bypass port of the at least one compression bypass assembly is positioned at a height relative to the housing wall of the shock housing that is below an at least one wear ring of the shock piston when the shock piston is in the compressed position.

11. The external bypass apparatus of claim 1, wherein the compression bypass port of the at least one compression bypass assembly provides a port bridge spanning the compression bypass port and having a width that is less than a width of the compression bypass port itself, such that the port bridge is capable of providing a supporting surface over which an at least one wear ring of the shock piston may travel as the shock piston moves between the compressed position and rebound position, while the compression bypass port remains substantially unobstructed for allowing shock fluid to pass therethrough.

12. The external bypass apparatus of claim 1, wherein the compression bypass valve of the at least one compression bypass assembly is a pilot-operated valve, whereby an axial position and flow rate of the compression bypass valve is a function of a pressure differential across the compression bypass valve.

13. The external bypass apparatus of claim 1, wherein the at least one compression bypass assembly is permanently secured to an outer surface of the housing wall of the shock housing.

14. The external bypass apparatus of claim 1, wherein:
the compression bypass port of the at least one compression bypass assembly is secured to an outer surface of the housing wall of the shock housing;
the compression bypass valve of the at least one compression bypass assembly is positioned within a valve holder that is secured to the outer surface of the housing wall of the shock housing; and
the compression bypass tube of the at least one compression bypass assembly is engaged with each of the compression bypass port and the valve holder.

15. The external bypass apparatus of claim 14, wherein the compression bypass tube of the at least one compression bypass assembly is held captive between each of the compression bypass port and the valve holder by the inserted compression bypass valve into the valve holder.

16. The external bypass apparatus of claim 14, wherein one or both of the compression bypass port and valve holder of the at least one compression bypass assembly is secured to the outer surface of the housing wall of the shock housing using a non-permanent attachment mechanism.

17. The external bypass apparatus of claim 14, wherein:
the compression bypass tube and compression bypass valve of the at least one compression bypass assembly are positioned within an outer bypass tube;
the outer bypass tube is threadably engaged with the valve holder; and
the compression bypass port of the at least one compression bypass assembly is engaged with the housing wall of the shock housing via an O-ring slip fit connection.

18. The external bypass apparatus of claim 1, further comprising a remote reservoir comprising:
a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber;
the first reservoir chamber containing a volume of a shock gas;
the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing;
the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising:
a converging first eductor end positioned proximal to the reservoir end of the reservoir tube;
a diverging second eductor end positioned distal to the reservoir end of the reservoir tube;
a constricted throat portion positioned between the first eductor end and second eductor end; and
an eductor base positioned between the first eductor end and the reservoir end of the reservoir tube, the eductor base providing a plurality of eductor apertures positioned circumferentially about a sidewall of the eductor base;
the second end of the reservoir housing providing a substantially concave eductor surface, with the eductor nozzle extending perpendicularly from a center of the concave eductor surface;
the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle;
whereby, when the shock piston moves from the rebound position into the compressed position, shock fluid ejects through the second eductor end of the eductor nozzle, creating a low-pressure area around the eductor apertures, which promotes shock fluid circulation within the second reservoir chamber and improves cooling efficiency of the shock fluid.

19. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising:
a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber;

the first reservoir chamber containing a volume of a shock gas;

the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing;

the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising:

a converging first eductor end positioned proximal to the reservoir end of the reservoir tube;

a diverging second eductor end positioned distal to the reservoir end of the reservoir tube;

a constricted throat portion positioned between the first eductor end and second eductor end; and an eductor base positioned between the first eductor end and the reservoir end of the reservoir tube, the eductor base providing a plurality of eductor apertures positioned circumferentially about a sidewall of the eductor base;

the second end of the reservoir housing providing a substantially concave eductor surface, with the eductor nozzle extending perpendicularly from a center of the concave eductor surface;

the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle;

whereby, when the shock piston moves from the rebound position into the compressed position, shock fluid ejects through the second eductor end of the eductor nozzle, creating a low-pressure area around the eductor apertures, which promotes shock fluid circulation within the second reservoir chamber and improves cooling efficiency of the shock fluid and, in turn, the shock housing.

20. An external bypass apparatus for a vehicle shock absorber, the shock absorber comprising a substantially cylindrical shock housing within which a shock piston is positioned, the shock piston dividing the shock housing into a first fluid chamber positioned at a first end of the shock housing and a second fluid chamber positioned at an opposing second end of the shock housing, the apparatus comprising:

an at least one compression bypass assembly external to and in fluid communication with the shock housing, the at least one compression bypass assembly comprising:

a compression bypass tube positioned in line between the first fluid chamber and second fluid chamber of the shock housing for allowing a volume of shock fluid within the first fluid chamber to bypass the shock piston as the shock piston moves into a compressed position;

an oval-shaped compression bypass port positioned within a housing wall of the shock housing, in line between the first fluid chamber of the shock housing and the compression bypass tube, for establishing fluid communication therebetween; and a one-way compression bypass valve positioned in line between the compression bypass tube and the second fluid chamber for selectively regulating a flow rate of the shock fluid passing through the compression bypass tube into the second fluid chamber, the compression bypass valve comprising:

a valve body providing an inlet port in fluid communication with the compression bypass tube and an outlet port in fluid communication with the second fluid chamber of the shock housing;

a hollow cylindrical spool slidably positioned within the valve body, an open end of the spool in fluid communication with the inlet port, with a circumferential sidewall of the spool providing an at least one spool aperture positioned and configured for temporarily allowing the shock fluid to flow radially therethrough, the spool configured for slidably moving within the valve body between an open position—wherein the at least one spool aperture is substantially aligned with the outlet port, thereby allowing the shock fluid to flow from the inlet port, axially through the open end of the hollow spool, radially through the spool aperture, and subsequently through the outlet port—and a closed position—wherein the at least one spool aperture is not aligned with the outlet port, such that the sidewall of the spool obstructs the outlet port and prevents the shock fluid from flowing therethrough;

a return spring positioned within the valve body and configured for biasing the spool into the closed position; and an adjustment stopper threadably engaged with the valve body and in mechanical communication with the return spring for allowing a spring force of the return spring to be selectively manually adjusted which, in turn, adjusts an amount of axial overlap between the at least one spool aperture and the outlet port when the spool is in the open position; and a substantially cylindrical reservoir housing within which an internal floating reservoir piston is positioned, the reservoir piston dividing the reservoir housing into a first reservoir chamber positioned at a first end of the reservoir housing and a second reservoir chamber positioned at an opposing second end of the reservoir housing, such that a first end of the reservoir piston is positioned within the first reservoir chamber while an opposing second end of the reservoir piston is positioned within the second reservoir chamber;

the first reservoir chamber containing a volume of a shock gas;

the second reservoir chamber in fluid communication with the second fluid chamber of the shock housing via a reservoir tube, with a reservoir end of the reservoir tube positioned within the second reservoir chamber of the remote reservoir and an opposing shock end of the reservoir tube positioned within the second fluid chamber of the shock housing;

the reservoir end of the reservoir tube providing an eductor nozzle configured for introducing a volume of shock fluid from the second fluid chamber of the shock housing into the second reservoir chamber of the remote reservoir using the Venturi effect when the shock piston moves from a rebound position into the compressed position, the eductor nozzle comprising:

a converging first eductor end positioned proximal to the reservoir end of the reservoir tube;

a diverging second eductor end positioned distal to the reservoir end of the reservoir tube;

a constricted throat portion positioned between the first eductor end and second eductor end; and an eductor base positioned between the first eductor end and the reservoir end of the reservoir tube, the eductor base providing a plurality of eductor apertures positioned circumferentially about a sidewall of the eductor base;

the second end of the reservoir housing providing a substantially concave eductor surface, with the eductor nozzle extending perpendicularly from a center of the concave eductor surface; and the second end of the reservoir piston providing a substantially concave piston surface, longitudinally opposing the concave eductor surface, with a rounded, substantially cylindrical protrusion extending perpendicularly from a center of the concave piston surface, such that the protrusion is axially aligned with the second eductor end of the eductor nozzle.

*    *    *    *    *